US 9,397,726 B2

(12) United States Patent
Dobyns (10) Patent No.: US 9,397,726 B2
(45) Date of Patent: Jul. 19, 2016

(54) SYSTEM AND METHOD FOR COMMUNICATING BETWEEN NEAR FIELD COMMUNICATION DEVICES WITHIN A TARGET REGION USING NEAR FIELD COMMUNICATION

(75) Inventor: Douglas Howard Dobyns, Lindon, UT (US)

(73) Assignee: RADEUM, INC., Orem, UT (US)

( * ) Notice: Subject to any disclaimer, the term of this patent is extended or adjusted under 35 U.S.C. 154(b) by 431 days.

(21) Appl. No.: 13/216,152

(22) Filed: Aug. 23, 2011

(65) Prior Publication Data

US 2012/0220227 A1  Aug. 30, 2012

Related U.S. Application Data

(60) Provisional application No. 61/376,196, filed on Aug. 23, 2010.

(51) Int. Cl.
*H04B 5/00* (2006.01)
*H04W 52/46* (2009.01)

(52) U.S. Cl.
CPC ............ *H04B 5/0031* (2013.01); *H04B 5/0081* (2013.01); *H04W 52/46* (2013.01)

(58) Field of Classification Search
CPC .................................. H04W 5/00; H04Q 5/22
USPC ................ 455/41.1, 41.2, 41.3, 569.1, 562.1; 340/41.1, 41.2, 41.3
See application file for complete search history.

(56) References Cited

U.S. PATENT DOCUMENTS

| 7,149,552 | B2 | 12/2006 | Lair | |
|---|---|---|---|---|
| 7,532,901 | B1 | 5/2009 | LaFranchise et al. | |
| 7,565,187 | B1 | 7/2009 | Dynok et al. | |
| 7,574,173 | B2 | 8/2009 | Terranova et al. | |
| 2003/0012219 | A1* | 1/2003 | Joo ........................ | H04L 29/06 370/449 |
| 2005/0064915 | A1 | 3/2005 | Lair | |
| 2006/0224048 | A1* | 10/2006 | Devaul ................. | A61B 5/0024 600/300 |
| 2007/0004464 | A1 | 1/2007 | Lair et al. | |
| 2007/0008140 | A1* | 1/2007 | Saarisalo ............. | G06K 7/0008 340/572.7 |
| 2007/0263596 | A1* | 11/2007 | Charrat .................... | H04L 45/00 370/351 |
| 2008/0032738 | A1* | 2/2008 | Boyer .................... | H04W 88/06 455/556.1 |
| 2008/0299907 | A1* | 12/2008 | Takayama ............ | H04B 5/0031 455/41.2 |
| 2009/0029743 | A9 | 1/2009 | Lair et al. | |
| 2009/0041241 | A1 | 2/2009 | Dobyns et al. | |
| 2009/0081943 | A1* | 3/2009 | Dobyns .................... | H04K 3/68 455/1 |
| 2009/0295545 | A1* | 12/2009 | O'Haire ............... | G06K 7/0008 340/10.5 |
| 2010/0015917 | A1* | 1/2010 | Symons ............... | H04B 5/0075 455/41.1 |
| 2010/0130127 | A1* | 5/2010 | Takayama ................ | H04B 5/02 455/41.1 |
| 2010/0190436 | A1* | 7/2010 | Cook ........................ | H04B 5/00 455/41.1 |
| 2010/0227553 | A1* | 9/2010 | Charrat ................ | G06Q 20/341 455/41.1 |

(Continued)

*Primary Examiner* — Md Talukder
(74) *Attorney, Agent, or Firm* — Thorpe North & Western LLP (57) ABSTRACT

Systems and methods for communication between near field communication devices within a target communication region using near field magnetic induction is disclosed. One method comprises generating a near field detectable signal at an active node having a power level sufficient to enable communication with a plurality of near field communication nodes located within the target communication region. Information is modulated onto the near field detectable signal using at least one of the near field communication nodes. The modulated information is detected at the active node. The information is then relayed on the near field detectable signal from the active node to at least one of the plurality of near field communication nodes within the target communication region.

35 Claims, 5 Drawing Sheets

(56) References Cited

U.S. PATENT DOCUMENTS

| | | | | |
|---|---|---|---|---|
| 2010/0277157 A1* | 11/2010 | Tani | ................... | G01R 31/002 324/72 |
| 2011/0181123 A1* | 7/2011 | Ichikawa | ............... | B60K 6/445 307/104 |
| 2011/0210831 A1* | 9/2011 | Talty | ................... | H04B 5/0031 340/10.51 |
| 2011/0212688 A1* | 9/2011 | Griffin | .............. | H04M 1/72569 455/41.1 |
| 2011/0298591 A1* | 12/2011 | Mickle | ............... | G06K 19/0707 340/10.33 |
| 2011/0312279 A1* | 12/2011 | Tsai | ....................... | G01S 11/02 455/67.11 |
| 2012/0099566 A1* | 4/2012 | Laine | .................. | H04M 1/7253 370/338 |
| 2012/0206097 A1* | 8/2012 | Soar | ........................ | F41G 1/34 320/108 |
| 2012/0220227 A1* | 8/2012 | Dobyns | ................ | H04B 5/0031 455/41.1 |
| 2012/0282857 A1* | 11/2012 | Zhang | ................. | H04B 5/0031 455/41.1 |
| 2013/0150135 A1* | 6/2013 | Takayama | ................ | H04B 5/02 455/574 |

\* cited by examiner

SYSTEM AND METHOD FOR COMMUNICATING BETWEEN NEAR FIELD COMMUNICATION DEVICES WITHIN A TARGET REGION USING NEAR FIELD COMMUNICATION

BACKGROUND

Near field magnetic communication is a form of wireless physical layer communication that transmits information by coupling non-propagating, quasi-static magnetic fields between devices. A desired magnetic field can be created by a generator coil which is measured using a detector coil. The signal modulation schemes often used in RF communications (amplitude modulation, phase modulation, and frequency modulation) can also be used in near-field magnetic systems.

Near-field magnetic communication systems are designed to contain transmission energy within the localized magnetic field. This magnetic field energy resonates near the communication system, but does not generally radiate into free space. This type of transmission is referred to as "near-field." The power density of near-field transmissions attenuates or rolls off at a rate proportional to the inverse of the range to the sixth power ($1/range^6$) or $-60$ dB per decade.

The use of localized magnetic induction distinguishes near field communications from known far-field radio frequency (RF) and microwave systems in that conventional wireless RF systems use an antenna to generate and transmit a propagated RF wave. In these types of systems, the transmission energy is designed to leave the antenna and radiate into free space. This type of transmission is referred to as "far-field." The power density of far-field transmissions attenuates or rolls off at a rate proportional to the inverse of the range to the second power ($1/range^2$) or $-20$ dB per decade.

One concern in wireless communication systems is the assignment and control of the RF frequency spectrum. As more and more wireless communication devices try to co-exist, the demand for available frequencies and clear channels becomes greater. Currently, most wireless communication systems rely on a far-field RF physical communication layer. The far-field propagated signals used in these communication systems can travel miles beyond the desired transmission range, causing interference with other wireless systems. To overcome this interference, each system can increase transmission power or be designed to share much of the same frequency spectrum. This spectrum allocation requires the implementation of complex time and frequency allocation algorithms. However, even with all of these work-around allocation schemes, the RF spectrum is still becoming increasingly crowded. The result is a steadily worsening interference and interoperability problem that simply cannot be overcome by transmitting with more power or moving to more complex and power-intensive frequency-management schemes.

Unlike far-field RF waves, the well defined communication region of magnetic-field energy allows for a large number of near-field magnetic communication systems to be in relatively close proximity while operating on the same frequency. Simultaneous access to a defined frequency spectrum is accomplished by localizing the communication region or spatial allocation and not by the allocation of frequencies or time division.

In practice, far-field RF signals used in existing wireless systems can be unpredictable, especially in urban environments, where frequency spectrum contention, EMI, fades, reflection, and blocking due to interfering obstacles such as buildings, vehicles, and industrial equipment can significantly reduce the effectiveness of current far-field RF systems. In addition, far-field RF systems are highly susceptible to EMI due to the nature of the antenna configurations which are designed to be sensitive to energy excitement of electromagnetic plane waves. In instances when the EMI is near the carrier frequency of a far-field RF system, the EMI will prevent the RF system from receiving transmissions, as the antenna will receive both the EMI signals and the intended RF signal equally well.

Near-field magnetic energy is contained in a magnetic field, forming a tight communication area which provides a high signal-to-noise ratio between devices. These magnetic fields are highly predictable and less susceptible to fading and reflection than RF electromagnetic waves used in current communication systems. In addition, the high signal-to-interference-plus-noise ratio (SINR) of near-field systems is less susceptible to EMI than typical RF systems.

The many advantages of near field communication systems make them useful for radio communication between first responders such as police, emergency, and fire fighters, as well as military communication systems. However, near field communication systems, such as systems using near field magnetic induction, are inherently short range. This short range typically restricts the use of near field communication systems to devices used in short range communication, such as personal area networks.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

DETAILED DESCRIPTION

Definitions

As used herein, the term "about" means that dimensions, sizes, formulations, parameters, shapes and other quantities and characteristics are not and need not be exact, but may be approximated and/or larger or smaller, as desired, reflecting tolerances, conversion factors, rounding off, measurement error and the like and other factors known to those of skill in the art.

As used herein, the term "near field communication nodes" includes a handheld radio, mobile radio, a remote sensor, a wireless game controller, a personal area network node, a mobile computing device, a portable multimedia device, a smart phone, a tablet computing device, a laptop computer, an embedded computing device or similar device.

An "embedded computing device", as used herein, is a computing device that is inlayed in a selected object such as a vehicle, a watch, a key fob, a ring, a key card, a token, a poker chip, a souvenir, a necklace amulet, and so forth. A computing device may be embedded in substantially any type of object.

By the term "substantially" is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Communication using near-field magnetic induction provides many benefits over communication using far field radio frequency signals. Near-field magnetic energy is contained in a magnetic field, forming a tight communication area which provides a high signal-to-noise ratio between devices. These magnetic fields are highly predictable and less susceptible to fading, reflection, and EMI than RF electromagnetic waves used in current communication systems. Thus, such systems can be used in high density, urban environments to provide highly reliable communication. Moreover, the −60 dB per decade roll-off rate of near field magnetic induction communication can significantly increase security by limiting reception and/or detection of the communication to a limited region, thereby making this form of communication ideal for military and first responder communications, medical applications, as well as for performing financial transactions via a wireless connection.

The tightly defined geographic region in which near field magnetic induction communication occurs also makes the technology useful for communicating data in high density applications, such as in stores, markets, and other locations having a large assortment of products. For instance, specific information about a large number of products can be broadcast from the location of a product without interfering with other product communication events.

The tightly defined region can also be useful for data transfer and voice communications in crowded regions such as malls, airports, public transit, and so forth. Since the near field magnetic induction communication occurs within the tightly defined geographic region due to the high roll-off rate, secure communication can be achieved with a small number of channels.

In addition to the tightly defined region, near field magnetic induction communication also provides additional advantages. The magnetic field used to communicate information allows penetration and signal quality that makes it ideal for communication in urban environments, mining and mountain locations, automotive industry, medical field, and other locations where interference can occur. For instance, in high density urban locations, typical radio frequency communication can be significantly encumbered by the materials used in the construction of homes, stores, and high rise buildings. These materials can interfere with and significantly degrade electric fields. However, magnetic fields can penetrate metal, rock, earth, and the human body better than typical radio frequency solutions. This results in high signal to noise ratio (SNR) levels that makes near field magnetic induction communication useful in applications with high levels of interference and/or high noise levels.

However, the −60 dB per decade roll-off rate of near field magnetic induction communication typically makes it difficult for devices to communicate over lengths greater than a few meters. The amount of power needed to communicate between two devices over a distance greater than a few meters is sufficient that is not amenable to long distance communication using typical battery powered devices for any significant length of time. In addition, the antenna configuration may be large relative to the portable communication device and therefore size prohibitive in many portable applications.

To enable communication between multiple devices using near-field magnetic induction over a greater distance without requiring each device in the network to source the necessary power required to generate its own magnetic field, an active node having a near field generator with relatively high power can be used to generate a magnetic field that substantially covers a target communication region.

The use of the active node allows two types of communication to take place between relatively low power near field communication nodes. First, the active node can act as a relay for communication between near field communication nodes. A near field communication node can modulate data onto the magnetic field emitted by the active node. The near field communication node may use an active or passive communication means to place information onto the magnetic field. For example, load modulation is a passive means for placing information onto the magnetic field. The passive communication means may not be detectable by other near field communication nodes. This information can, however, be detected by the active node.

The active node can relay the information onto the magnetic field emitted by the active node by varying a characteristic of the near field detectable signal, with the characteristic selected from the group consisting of a frequency, a phase, an amplitude, and combinations thereof, or the like. The information can be relayed using the higher power active node in such a way that it is detectable by one or more of the near field communication nodes located within the target communication region.

Alternatively, one or more of the near field communication nodes located within the target communication region can be configured to detect information that was placed on the magnetic field emitted by the active node. For example, a first near field communication node can modulate the magnetic field emitted by the active node. This may be done through passive or active means. While a passive means such as load modulation can be used, an active means such as a digital modulation scheme may be more readily detectable. A second near field communication node can detect the information modulated onto the magnetic field emitted by the active node and extract the information from the magnetic field. The modulated information may be configured to be extracted by one or more selected near field communication nodes within the target communication region.

In both cases, the use of the active node allows near field communication devices that are either passive or low power devices to communicate within the target communication region at a distance that would not be possible without the use of the active node.

The near field communication nodes can communicate with relatively little power. For example, passive communication means such as load modulation can be used to modulate the magnetic field emitted by the active node using the energy in the magnetic field to power the communication. This enables communication throughout the target communication region with substantially lower power levels and significantly less radio frequency interference relative to devices designed to communicate using far field electromagnetic radiation such as radio waves. In addition, the low power level needed by handheld radios or other types of sensors to receive and transmit data via the magnetic field emitted by the active node enables battery life to last significantly longer than comparable devices configured to communicate via radio frequency waves over a similar region. The near field communication devices can communicate while consuming a power level that is significantly less than the active node. The power consumption of each near field communication device can be $1/100^{th}$, $1/1,000^{th}$, or even less than $1/1,000,000$ of the power consumed by the active node. For instance, the active node may consume 1 watt in operation, while each near field communication device may consume several microwatts while operating. The actual power consumption by the active node and each passive node can depend on the system specifications.

Thus, the use of an active node to facilitate communication between a plurality of near field communication nodes can be useful in a variety of different types of communication, including, but not limited to, sensor arrays, personal area networks, defined area networks, military communications, commercial communications, and so forth.

Figure 1:
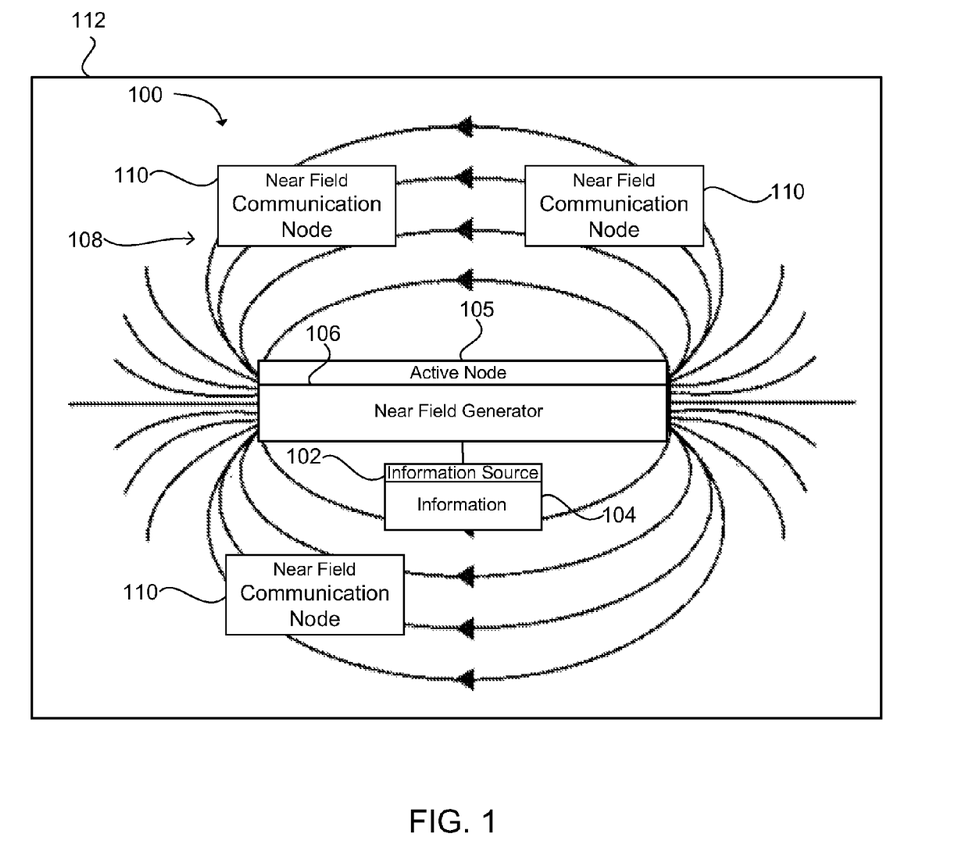
FIG. 1 illustrates an exemplary block diagram of a system for communication between near field communication devices within a target communication region using near field magnetic induction in accordance with an example.

FIG. 1 illustrates one embodiment of a system for communication between near field communication devices about a target communication region using near field magnetic induction. The near field communication system, shown generally at 100, includes an information source 102 that produces information 104 as an output. The information may be in an analog or digital format. For example, the information may be a continuous analog audio signal, a digitized audio signal, a data sequence, or the like. As a particular example, the information source may include a microphone for converting an acoustic signal to an electric signal, a digitizer, a computer, other electronic equipment, or combinations thereof.

The system includes an active node 105 that includes a means for generating a near field detectable information signal, such as a near field generator 106. The near field generator can generate a near field signal 108 having the information encoded therein. For example, the near field generator may generate an alternating magnetic field using a large area coil that functions as an antenna. The large area coil is also referred to as a near field magnetic induction transducer. The large area coil can generate a strong, high frequency electromagnetic field. The wavelength of the frequency used is selected such that the wavelength is typically several times greater than the distance between the active node and the near field communication nodes 110. This enables the electromagnetic field to be treated as a near field with a simple magnetic alternating field. In the example illustrated in FIG. 1, the near field signal 108 is shown as a plurality of magnetic field flux lines emanating from the near field generator.

The active node 105 is configured to generate the near field signal 108 to enable communication between a plurality of near field communication nodes 110 over a target communication region 112. The target communication region can be a predefined area, such as a building or geographic location, a portion of a building, and so forth. The target communication region can be three dimensional, to include high rise buildings and locations beneath the surface, such as basement levels and other subterranean locations. The antenna coil in the near field generator 106 can be configured to shape the near field signal 108 based on the dimensions of the target communication region. Alternatively, a substantially symmetrical magnetic field can be generated for communication at different types of target communication regions.

While the target communication region 112 is illustrated here with a definite outer boundary, the actual outer boundary is dependent on a number of system variables, including the sensitivity of the receivers. For each receiver, the outer boundary of the target communication region 112 corresponding to communication from the active node to a passive node is the distance from the near field generator 106 at which data modulated on the near field signal 108 can no longer be accurately detected. In addition, communication from a passive node to an active node or from a passive node to another passive node, is governed by the sensitivity of the load modulation circuitry in the active node and/or the detection sensitivity of both the active node and the passive node.

In order to achieve generation of the near field signal 108 over the target communication region 112, the near field generator 106 can be configured to output the near field signal 108 with substantially greater power than is possible with a typical portable communication device, such as a handheld radio, a cell phone, a mobile computing device, a sensor tag, a medical implant device, and so forth. Power output from a portable communication device, such as a handheld radio, is typically less than 5 watts to extend the length of the battery life in the device.

The near field generator 106 located at the active node 105 can generate a near field signal having substantially greater power than is typically transmitted with a handheld device to enable the near field communication nodes 110 to communicate with the active node 105 over the target communication region 112. In one embodiment, the power output to generate the near field signal 108 from the near field generator can be greater than 10 watts. The power output of the near field generator 106 may be as high as hundreds of kilowatts when communication is needed over a relatively large target communication region, such as a building or store.

The wavelength at which the near field generator 106 transmits the near field signal 108 can be selected based on the maximum desired size of the target communication region 112. The near field range for a signal is typically defined to be a distance of less than $\lambda/2\pi$, where $\lambda$ is the wavelength of the signal. In order to maintain near field communication, the frequency of the near field signal can be selected such that the maximum distance between the near field generator 106 and a perimeter of the target communication region 112 is less than the wavelength ($\lambda$) of the signal divided by $2\pi$. For instance, if the frequency of the near field signal is set at 1 MHz, the wavelength of the signal is 300 meters. This sets the approximate distance of the target communication region 112 at approximately 47 meters in each direction from the near field generator 106. This boundary is not considered to be an absolute boundary. Rather, it can be used as an estimate to determine a desired operating frequency based on the size of the target communication region 112.

The near field generator 106 may be permanently installed at a selected location, such as a building or outdoor location. Alternatively, the near field generator may be mounted on a portable device such as a vehicle, a trailer, a cart, or other type of transport mechanism. A relatively smaller version of a near field generator 106 can be configured to be carried by one or more individuals. For example, the near field generator may be in a backpack or other type of carrying device. The near field generator can also be mounted on a device having handles or wheels that enables it to be moved manually. A battery power source may be used for short term communication, such as a few hours. For longer term, or higher power communication, the near field generator 106 can be connected to the electrical grid to provide power. In another embodiment, a generator or automobile alternator may be used to provide power to the near field generator.

Figure 2A:
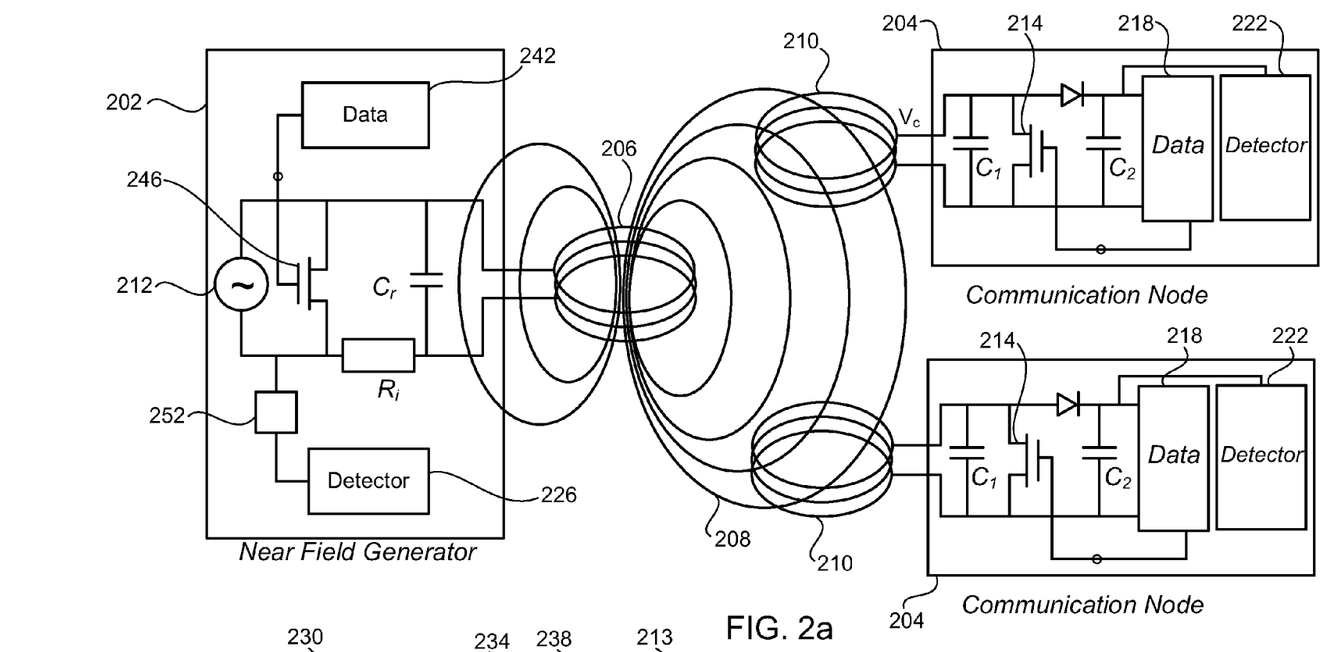
FIG. 2*a* illustrates one embodiment of the system for communication between near field communication devices within a target communication region using near field magnetic induction in accordance with an example.

FIG. 2a provides an illustration of one example embodiment of a system for communication between near field communication devices within a target communication region using near field magnetic induction and load modulation. The system includes a near field generator 202. The generator includes a transducer 206 configured to generate a strong, high powered electromagnetic field. A power supply 212 is connected to the antenna coil 206. The power level and frequency of operation can be selected based on the desired operating parameters of the system and the size of the target communication region, as previously discussed.

The operating frequency is selected such that the wavelength is several times greater than the distance between the generator's antenna and the antenna coil 210 of each near field communication node 204. This allows the electromagnetic field to be treated as a simple magnetic alternating field 208.

A small portion of the alternating magnetic field 208 enters the antenna coil 210 of the near field communication node 204. Each near field communication node is located within the near field of the magnetic field within a target communication region. The alternating magnetic field 208 generates a current in the near field communication node's antenna coil 210 through inductance. Changes in the current can be used to convey information. The energy in the current may incidentally be used for powering or subsidizing a slave device, such as a near field communication node 204. Alternatively, each near field communication node can include a separate power supply.

The near field generator 202 includes a capacitor $C_r$ that is connected in parallel with the near field generator's antenna coil 206. The capacitance value of $C_r$ is selected to enable the coil inductance of the antenna coil to form a resonant circuit with a resonant frequency that corresponds with the transmission frequency of the near field generator. The antenna coil 210 of each near field communication node 204 and the capacitor $C_1$ form a resonant circuit that is also tuned to the transmission frequency of the near field generator 202. The voltage $V_c$ at the antenna coil of the near field communication node, as measured across the capacitor $C_1$, reaches a maximum due to resonance that occurs in the resonant circuit at a selected frequency based on the value of $C_r$.

The position of the antenna coils 206, 210 of the near field generator 202 and near field communication nodes 204 provide a transformer type coupling. The efficiency of power transfer between the two antennas is proportional to the operating frequency f, the number of windings in the antenna coil n, the area A enclosed by the transponder coil, the angle of the two coils relative to each other, and the distance between the two coils.

Power transfer between the antenna coils 206, 210 of the near field generator 202 and near field communication nodes 204 is maximum when the respective antennas of the near field generator and the near field communication node are positioned in parallel relative to one another and minimum when they are positioned orthogonally relative to one another. Since each near field communication node can be mobile, the angular displacement between the two coils may not be controlled.

In order to provide an increased power transfer, multiple orthogonal antenna coils can be used in the near field generator and/or each near field communication node. For example, three antennas positioned to be substantially mutually orthogonal in the X, Y, and Z axes can provide a significant increase in both the transmitted and received power levels. The use of multiple orthogonal antennas minimizes the need to maintain the near field communication nodes in a selected position relative to the near field generator 202 since the signal can be received on one or more of the mutually orthogonal antennas. Multiple orthogonal antennas can be used to enhance the detection and extraction of information contained in the magnetic field and enhance the modulation of information onto the magnetic field.

When one or more of the near field communication nodes 204, having an antenna with a resonant frequency that corresponds with the transmission frequency of the near field generator 202, is placed within the magnetic alternating field 208 emitted by the near field generator, the antenna coils 210 draw energy from the alternating magnetic field. This energy drain can be sensed by the near field generator detection circuitry. For example, in one embodiment, by tuning and detuning the resonance of one or more near field communication nodes 204, the load on the magnetic field 208 is changed. This change can be used to convey desired information. The change in the load can cause a change in impedance to occur at the antenna coil 206. This changes the voltage level at the near field generator's antenna 206, thereby creating an amplitude modulation of the voltage level at the antenna coil 206. By measuring the small changes in the near field generator antenna's voltage that is used to generate the magnetic field, the communication data can be extracted. The change in the antenna's voltage relates to the information communicated by the near field communication device.

In one embodiment, a load in the near field communication node 204 can be switched on and off by switching the drain-source resistance of a field effect transistor (FET) 214 in the near field communication node. The timing with which the load resistor is switched on and off can be controlled to communicate data 218 from the near field communication node to the near field generator 202. The data may be analog data, digitized voice data, computer data, or any other type of data desired to be transmitted from one near field communication node to another.

In one embodiment the data can be communicated using a subcarrier. For example, a near field communication node load can be switched at a switching frequency of $f_s$. Two spectral lines are created at a distance of $+/-f_s$ around the carrier frequency (i.e. the transmission frequency of the near field generator 202). For instance, if the transmission frequency is 1 MHz and the switching frequency is 128 kHz, then the subcarrier is located at 1.128 MHz and 872 KHz. Each of these frequencies are considered to be a subcarrier. Use of a subcarrier enables simpler detection of the data.

Figure 2B:
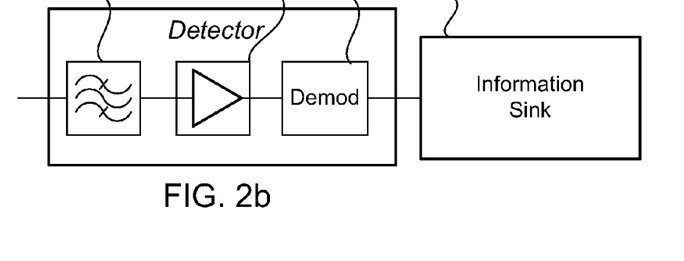
FIG. 2*b* illustrates an embodiment of a detector used in the system for communication between near field communication devices in accordance with an example.

To receive the data transmitted from a near field communication node 204, the detector 226 in the near field generator 202 can include a bandpass filter 230, an amplifier 234, and a demodulator 238, as shown in FIG. 2b. A subcarrier frequency can be isolated using the bandpass filter. The signal can then be amplified and demodulated to recover the data sent by the near field communication node. The decoded information may be output to an information sink 213. The information sink may include a microprocessor, a digital to analog conversion, a speaker that converts an electronic signal to an acoustic signal, a personal computer, other electronics equipment, or combinations thereof. The near field induction can be used as the physical link in a wireless network and known networking layers can be used on top of the physical link layer.

The near field generator 202 can also communicate information to the near field communication node(s) 204. The near field generator 202 can also include a data source 242 and a modulation device 246 that can be used to transmit data by modulating the magnetic field 208 on a desired subcarrier to communicate the data to one or more desired near field communication nodes 204. A detector 222 at the near field communication node(s) 204 can filter, amplify, and demodulate the signal to recover the data, as illustrated in the example illustration of a detector in FIG. 2b. The detected information can then be communicated to an information sink at the near field communication node(s) for further processing and/or storage.

While load modulation has been described in the examples, it is also possible to use other forms of modulation, such as frequency shift keying (FSK), phase shift keying (PSK), or other types of amplitude shift keying (ASK). Any form of modulation that can allow wireless communication in the near field between the active node and near field communication nodes is considered to be within the scope of the present invention.

In one embodiment, each of the plurality of communication nodes can be identifiable with a predetermined address to enable the active node to communicate with one or more of the plurality of near field communication nodes. The data packets sent by one near field communication node 204 can include header information that identifies one or more specific near field communication node(s) for which the data packets are intended using the predetermined address. The near field generator 202 can receive the information and relay the information by modulating the alternating magnetic field 208. The near field generator can include a memory buffer 252 that can be used to buffer the information received and retransmit the data to one or more specific near field communication nodes. The buffer may be a first-in-first-out (FIFO) type buffer, or a more complex memory device capable of storing multiple different signals from a plurality of near field communication nodes. The data may be scrambled or encrypted so that only the designated near field communication nodes can recover the data.

For instance, a first near field communication node 204 may be located 45 meters due east of the near field generator 202. A second near field communication node may be located 45 meters due west of the near field generator 202. The two near field communication nodes are sufficiently far apart that it is not possible for the nodes to communicate through near field magnetic induction. However, each near field communication node can communicate by relaying its data through the near field generator to the other near field communication node. This enables near field communication nodes such as first responder radios, a remote sensor, a wireless game controller, a mobile computing device, a portable multimedia device, a smart phone, a tablet computing device, a laptop computer, an embedded computing device or similar device to be used to communicate in a relatively large area, such as a vehicle, a street, a store, a high rise building, a low rise building, a warehouse, a factory, or other type of location.

The near field generator can be setup near the intended location to provide the alternating magnetic field 208. The alternating magnetic field can penetrate in urban environments such as high rise buildings much more readily than an electromagnetic signal. In addition, electromagnetic interference is significantly reduced using the near field magnetic induction to communicate the data. This significantly reduces potential dead zones within the building(s) and enables people and devices to more effectively communicate in such an environment. Moreover, a very small amount of power is needed for the near field communication nodes to add data to the alternating magnetic field 208. For instance, load modulation by turning an FET 214 on and off can be accomplished with micro amps of current. This power may be obtained from the alternating magnetic field itself. This enables the near field communication nodes to be used for a long period between recharges, such as several weeks.

In another embodiment, a first near field communication node 204 can communicate directly with another near field communication node 204 while the two nodes are located within the boundary of the alternating magnetic signal. Using load modulation, or another modulation scheme, data from the first near field communication node 204 can be added to the alternating magnetic signal 208 emitted by the near field generator. This data can be detected and recovered by one or more desired near field communication nodes that are also within the boundary of the alternating magnetic signal. The near field communication node can then reply back directly to the first near field communication node using the same load modulation procedure, as previously discussed. If no response is received within a predetermined time period, then it can be assumed that the near field communication nodes are not within range of each other and a signal can be sent to the near field generator 202 to act as a relay between the near field communication nodes.

In another example, a near field generator may output a relatively low power alternating magnetic field over a limited range to allow passive and/or low power near field communication nodes to communicate within the limited range. For example, a near field generator may be configured to output a magnetic field with a transmit power of about 100 milliwatts (mW). The near field generator may be used to allow multiple near field communication nodes to communicate over a relatively small area, such as multiple communication nodes located in a personal area network (PAN). The near field communication nodes may be medical sensors within a person's body. The medical sensors may be low power sensors or passive sensors that do not have internal power sources. In one embodiment, the near field generator can output a magnetic field with a transmit power that is at least ten times greater than the power available at a near field communication node located within the area defined by the near field generator's alternating magnetic field. Thus, the near field communication nodes may not have sufficient power to communicate with other near field communication nodes without the magnetic field provided by the near field generator.

The near field generator can output a magnetic field that enables the medical sensors (or other types of near field communication nodes) to communicate within the area defined by the near field generator's alternating magnetic field. The near field communication nodes may be configured to communicate with other nodes while the alternating magnetic field is operable.

One or more small networks having a plurality of low power or passive near field communication nodes can be created using the near field generator. The network may be a personal area network around a person, a network within a ground or air transportation vehicle, or other type of defined area in which multiple low power or passive near field communication devices are located. The size of the network may vary from less than one meter to hundreds of meters, depending on the application.

The examples described above are not intended to be limiting. The illustrations provided in FIGS. 2a and 2b show one exemplary way of implementing the systems and methods described. Additional embodiments with different radio architectures may be implemented as well, as can be appreciated. Any type of near field magnetic induction system operable to transmit and receive analog or digital information can be used, as disclosed above.

Figure 3:
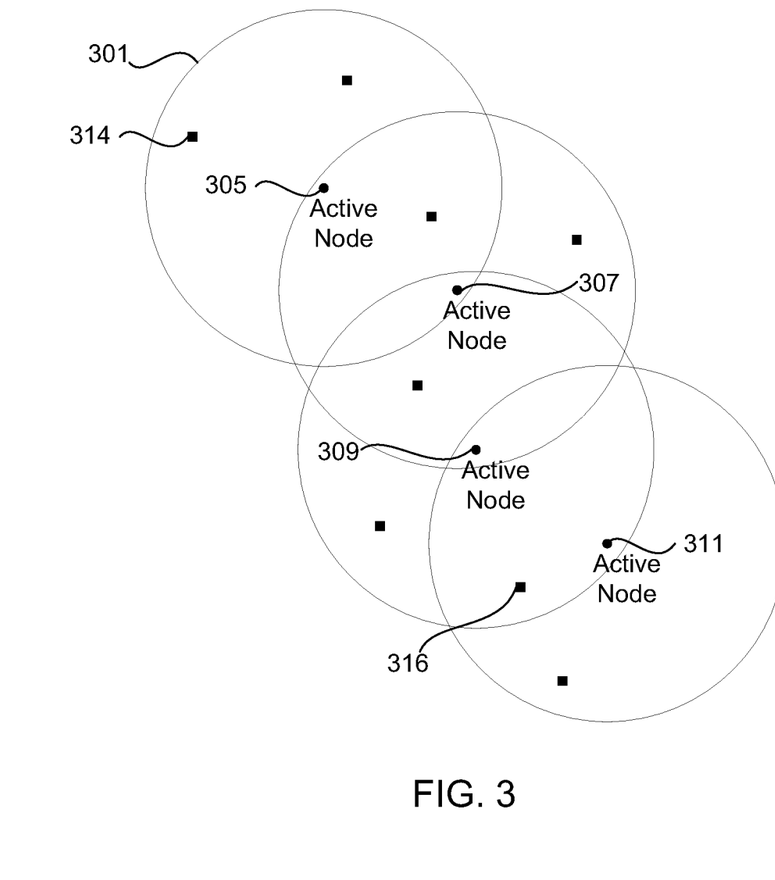
FIG. 3 illustrates an embodiment of the system for communication between overlapping active nodes in accordance with an example.

In another embodiment illustrated in FIG. 3, a plurality of active nodes 305-311 can be used as repeaters to pass along information from a first active node to a second active node that is located outside of the range of the first active node. Each active node can include a near field generator 106 (FIG. 1) operable to transmit a near field signal within the designed range of the active node and to detect changes in the near field signal, as previously disclosed. In the example illustration of FIG. 3, the circle surrounding each active node represents the active node's target communication region 301. While each active node is shown in FIG. 3 as having a target communication region of similar size, it is possible that each active node may have a different sized region. The size of the active node's target communication region can be based on a number of factors such as the power output, sensitivity, quality, resonance, and so forth.

Information from one active node, such as active node 305, can be communicated to an active node outside of node 305's target communication region by passing the information through at least one other node that is within the active node's range. In this example, the information can be communicated from node 305 to node 307 to node 309 and finally to node 311. Each active node 305-311 can include controller information that enables the active nodes to be aware of additional active nodes with which it can communicate. Mesh networking protocols can be used to identify other active nodes and the number of hops the information will travel to communicate with a selected node.

One or more near field communication nodes 314 may be located within the range of each active node. Near field communication nodes are illustrated as squares within the range of the active node. As previously discussed, each near field communication node can communicate with its active node 305 through the near field generator. A near field communication node, such as node 314 can communicate with another near field communication node 316 by communicating information to the active node 305, which can then pass the information to the active node in which the intended recipient 316 is located. In this example, the information can be communicated from near field communication node 314 to active node 305, then passed to active node 307 and 309. Active node 309 can then transmit the information to near field communication node 316 through active node 309's near field generator. The information may also be communicated to active node 311, since near field communication node 316 is within the range of both active node 309 and active node 311.

Each active node 305-311 can include a controller with information that enables the active node to be aware of additional active nodes with which it can communicate. Each active node can also include identification information pertaining to the near field communication nodes located within the communication range of the active node. Networking protocols, including mesh networking protocols, can be used to identify other active nodes and near field communication nodes. This information can be used to determine routing information for received signals and optimal routes to transmit the signals to the intended recipient.

The near field communication systems, such as the example embodiments disclosed above, can be useful in a variety of applications such as audio transmission, video transmission, proximity/orientation detection, data transmission, sensors, and message signaling. These applications may be beneficial in many fields, including the consumer, industrial, commercial, medical, agricultural, and military markets. For example, a near field communication system can be used to provide a wireless link between a headset and a radio, or between two radios, such as: a public service transceiver, military transceiver, cellular telephone, amateur radio transceiver, or the like. The radio itself may be based on near-field communication allowing for wireless communication between individuals, vehicles, electronic devices, or other means associated with radio use. While examples of specific types of near field communication have been provided, they should not be considered limiting.

Figure 4:
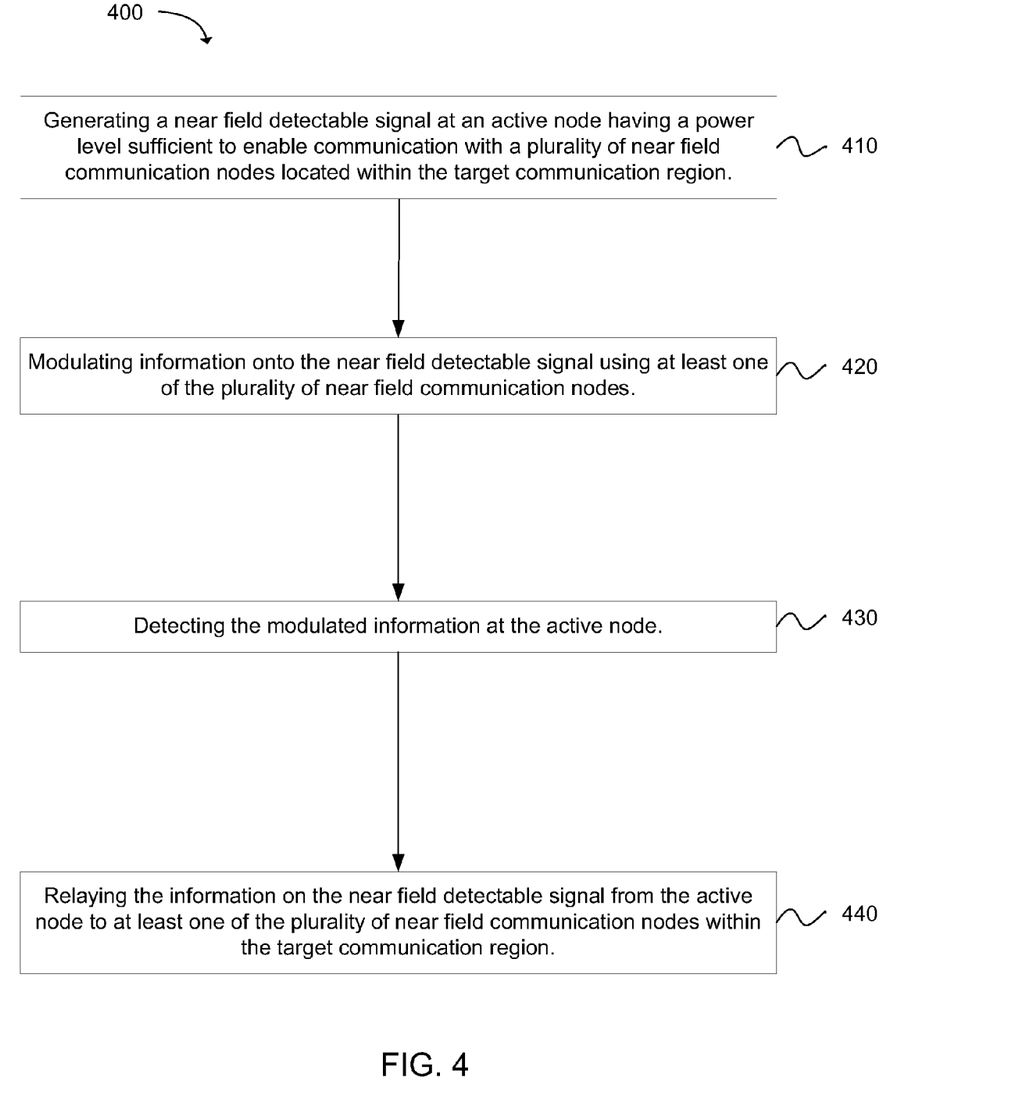
FIG. 4 depicts a flow chart of a method for communication between near field communication devices within a target communication region using near field magnetic induction in accordance with an example.

In one example embodiment, a method 400 for communication between near field communication devices within a target communication region using near field magnetic induction is disclosed, as depicted in the flow chart of FIG. 4. The method comprises generating 410 a near field detectable signal at an active node having a power level sufficient to enable communication with a plurality of near field communication nodes located within the target communication region. Information is modulated 420 onto the near field detectable signal using at least one of the plurality of near field communication nodes. The modulated information is detected 430 at the active node. The information is then relayed 440 on the near field detectable signal from the active node to at least one of the plurality of near field communication nodes within the target communication region.

Figure 5:
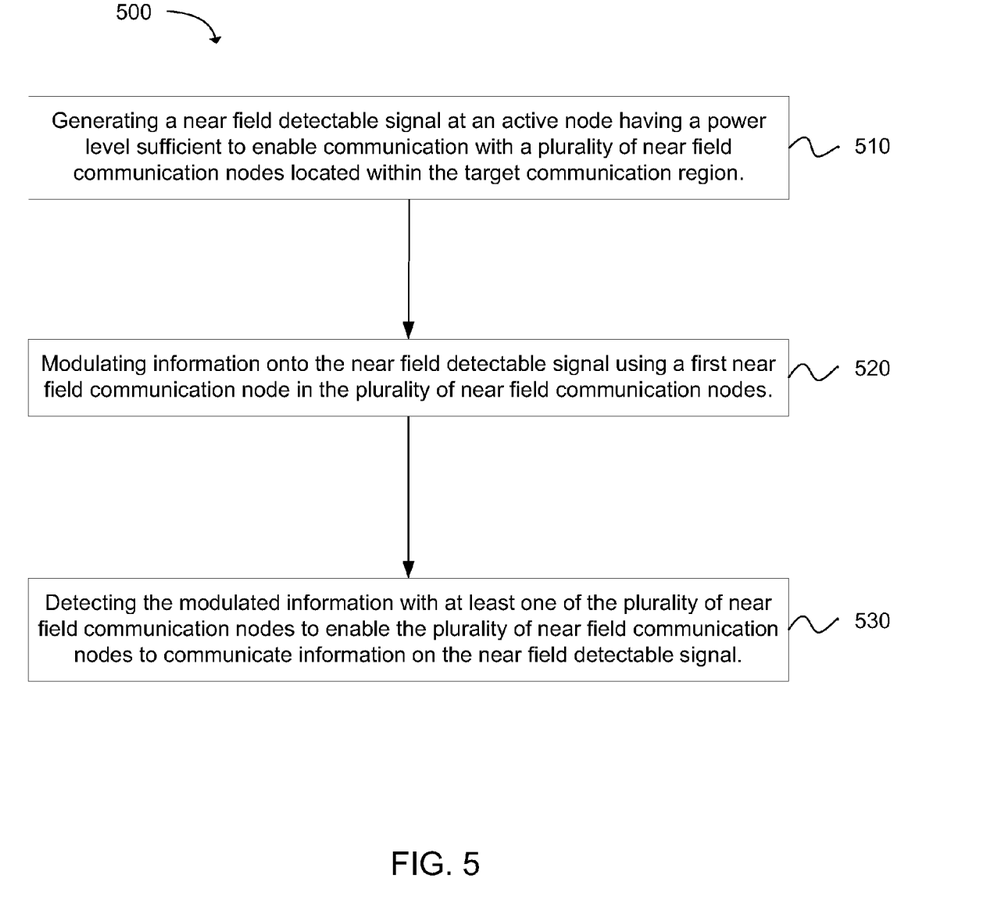
FIG. 5 depicts a flow chart of a method for communicating between near field communication devices within a target communication region using near field magnetic induction Reference will now be made to the exemplary embodiments illustrated, and specific language will be used herein to describe the same. It will nevertheless be understood that no limitation of the scope of the invention is thereby intended.

In another example embodiment, a method 500 for communicating between near field communication devices within a target communication region using near field magnetic induction is disclosed. The method comprises generating 510 a near field detectable signal at an active node having a power level sufficient to enable communication with a plurality of near field communication nodes located within the target communication region. The active node does not add information to the magnetic field. Information is modulated 520 onto the near field detectable signal using a first near field communication node in the plurality of near field communication nodes. The modulated information is then detected 530 with at least one of the plurality of near field communication nodes to enable the plurality of near field communication nodes to communicate information on the near field detectable signal.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Various techniques, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A system for communication between near field communication devices within a target communication region using near field magnetic induction, comprising:
   an active node with a near field magnetic induction transducer configured to generate a near field detectable signal that defines a target communication region; and
   a plurality of near field magnetic induction communication nodes located within the defined target communication region with a communication range distance that is less than a distance of the defined target communication region, wherein one or more of the plurality of near field magnetic induction communication nodes are configured to communicate information over a distance greater than the communication range distance by modulating the information onto the near field detectable signal to be detectable by selected near field communications nodes of the plurality of near field magnetic induction communication nodes to enable the one or more of the plurality of near field communication nodes to communicate the information to the selected near field communication nodes within the defined target communication region; wherein the active node has a plurality of mutually orthogonal antennas, wherein at least one of the mutually orthogonal antennas are operable to extract information from the near field detectable signal and modulate information onto the near field detectable signal.

2. The system of claim 1, wherein the active node has a power level at least 10 times greater than a power level consumed by a near field communication node located within the target communication region.

3. The system of claim 1, wherein the active node is configured to generate the near field detectable signal at a power level greater than 1 kilowatt.

4. The system of claim 1, wherein the active node is configured to generate the near field detectable signal at a power level greater than 100 kilowatts.

5. The system of claim 1, wherein the near field magnetic induction transducer is configured to generate the near field detectable signal at a frequency having a wavelength that is at least 2pi times greater than a distance between the active node and the plurality of near field communication nodes.

6. The system of claim 5, wherein the target communication region has a perimeter with a distance from the active node that is less than 2pi times the wavelength of the near field detectable signal.

7. The system of claim 1, wherein each of the plurality of communication nodes are configured to modulate the information onto the near field detectable signal using load modulation.

8. The system of claim 1, wherein the near field magnetic induction communication nodes are configured to relay the information onto the near field detectable signal by varying a characteristic of the near field detectable signal, with the characteristic selected from the group consisting of a frequency, a phase, an amplitude, and combinations thereof.

9. The system of claim 1, wherein each of the plurality of communication nodes are identifiable with a predetermined address to enable the active node to communicate with one or more of the plurality of near field communication nodes.

10. The system of claim 1, wherein the active node is further configured to encrypt the information such that it can only be decrypted by one or more selected near field communication nodes.

11. The system of claim 1, wherein each of the plurality of communication nodes are configured to encrypt the information such that it can only be decrypted by one or more of the active node and selected near field communication nodes.

12. The system of claim 1, wherein the active node is further configured to communicate with additional active nodes to enable data from a first active node to be passed through a second active node to a third active node that is outside of the first active node's range.

13. The system of claim 1, wherein at least one of the plurality of near field communication nodes has a plurality of mutually orthogonal antennas, wherein at least one of the mutually orthogonal antennas are operable to extract information from the near field detectable signal and modulate information onto the near field detectable signal.

14. The system of claim 1, wherein the plurality of near field communication nodes comprise a personal area network.

15. The system of claim 1, wherein the plurality of near field communication nodes comprise a mesh network.

16. A method for communication between near field communication devices within a target communication region using near field magnetic induction, comprising:
generating a near field detectable signal at an active node having a power level sufficient to generate a near field detectable signal that defines a target communication region over a selected distance to enable communication by a plurality of near field communication nodes located within the selected distance of the target communication region, wherein the plurality of near field communication nodes have a communication range distance that is less than the selected distance of the target communication region;
modulating information onto the near field detectable signal by at least one of the plurality of near field communication nodes to enable the at least one near field communication node to communicate modulated information over a distance greater than the communication range distance; and
detecting the modulated information at one or more of the plurality of communication nodes, wherein the one or more of the plurality of communication nodes includes a plurality of mutually orthogonal antennas, with at least one of the plurality of mutually orthogonal antennas configured to detect information contained in the near field detectable signal.

17. The method of claim 16, further comprising generating the near field detectable signal at the active node having a power level of greater than 1 kilowatt.

18. The method of claim 16, further comprising generating the near field detectable signal at the active node having a power level of greater than 100 kilowatts.

19. The method of claim 16, further comprising generating the near field detectable signal at a frequency having a wavelength that is at least 2pi times greater than a distance between the active node and the plurality of near field communication nodes.

20. The method of claim 16, further comprising generating the near field detectable signal at a frequency having a wavelength such that a perimeter of the target communication region is less than 2pi times the wavelength of the near field detectable signal.

21. The method of claim 16, further comprising:
modulating the information onto the near field detectable signal using a first near field communication node in the plurality of near field communication nodes; and
detecting the modulated information at a second near field communication node in the plurality of near field communication nodes at a distance greater than the communication range distance of at least one of the first near field communication node and the second near field communication node.

22. The method of claim 21, further comprising detecting the modulated information on at least two near field communication nodes in the plurality of near field communication nodes.

23. The method of claim 16, further comprising modulating information onto the near field detectable signal with at least one of the plurality of near field communication nodes by varying a characteristic of the near field detectable signal, with the characteristic selected from the group consisting of a frequency, a phase, an amplitude, and combinations thereof.

24. The method of claim 16, further comprising relaying the modulated information on the near field detectable signal from the near field communication nodes by varying a characteristic of the near field detectable signal, with the characteristic selected from the group consisting of a frequency, a phase, an amplitude, and combinations thereof.

25. The method of claim 16, wherein modulating information onto the near field detectable signal further comprises identifying a destination for the information as at least one near field communication module located in the target communication region.

26. The method of claim 16, wherein modulating information onto the near field detectable signal further comprises modulating the information onto the near field detectable signal and communicating the information using at least one of a plurality of mutually orthogonal antennas at the near field communication node.

27. The method of claim 16, wherein modulating information onto the near field detectable signal further comprises relaying the information on the near field detectable signal from the active node to at least one of the plurality of near field communication nodes within the target communication region by detecting the information at the active node using at least one of a plurality of mutually orthogonal antennas and modulating the detected information on to the near field detectable signal to transmit the information to the at least one near field communication node.

28. A method for communicating between near field communication devices within a target communication region using near field magnetic induction, comprising:
generating a near field detectable signal at an active node having a power level sufficient to enable communication with a plurality of near field communication nodes located within the target communication region, wherein the plurality of near field communication nodes each have a communication range distance that is less than a distance of the target communication region;
modulating information onto the near field detectable signal using a first near field communication node in the plurality of near field communication nodes; and
detecting the modulated information with at least one of the plurality of near field communication nodes at a distance greater than the communication range distance to enable the plurality of near field communication nodes to communicate information within the target communication region on the near field detectable signal;
wherein the active node has a plurality of mutually orthogonal antennas, wherein at least one of the mutually orthogonal antennas are operable to extract information from the near field detectable signal and modulate information onto the near field detectable signal.

29. The method of claim 28, wherein generating the near field detectable signal at the active node does not add information to the magnetic field.

30. The method of claim 28, further comprising modulating information onto the near field detectable signal using the active node.

31. The method of claim 28, wherein modulating information onto the near field detectable signal further comprises modulating the information onto the near field detectable signal using at least one of a plurality of mutually orthogonal antennas at the near field communication node.

32. The method of claim 28, wherein modulating information onto the near field detectable signal further comprises including an identification address as a destination for the information as at least one near field communication module located in the target communication region.

33. The method of claim 28, wherein generating a near field detectable signal at an active node having a power level sufficient to enable communication with a plurality of near field communication nodes located within the target communication region further comprises defining the target communication region to have a perimeter with a distance from the active node that is less than 2pi times the wavelength of the near field detectable signal.

34. The method of claim 16, further comprising relaying the information on the near field detectable signal from the active node to at least one of the plurality of near field communication nodes within the target communication region.

35. The system of claim 1, wherein the active node is configured to detect the information modulated onto the near field detectable signal and relay the information to at least one of the plurality of near field communication nodes over a distance greater than the communication range distance using the near field detectable signal.

* * * * *